United States

[11] 3,630,599

[72] Inventor Roscoe J. Donnel
Glendale, Calif.
[21] Appl. No. 82,662
[22] Filed Oct. 21, 1970
[45] Patented Dec. 28, 1971
[73] Assignee Xerox Corporation
Stamford, Conn.

[54] MECHANICALLY COMPENSATED ZOOM LENS SYSTEM
5 Claims, 4 Drawing Figs.

[52] U.S. Cl. .......................................................... 350/184
[51] Int. Cl. ........................................................ G02b 15/14
[50] Field of Search ............................................ 350/184, 186

[56] References Cited
UNITED STATES PATENTS
3,143,590   8/1964   Higuchi....................... 350/184

*Primary Examiner*—David Schonberg
*Assistant Examiner*—Paul A. Sacher
*Attorneys*—James J. Ralabate, Franklyn C. Weiss and Irving Keschner ABSTRACT: A mechanically compensated zoom lens system consisting of two movable lens groups, each lens group consisting of four air-spaced lens elements.

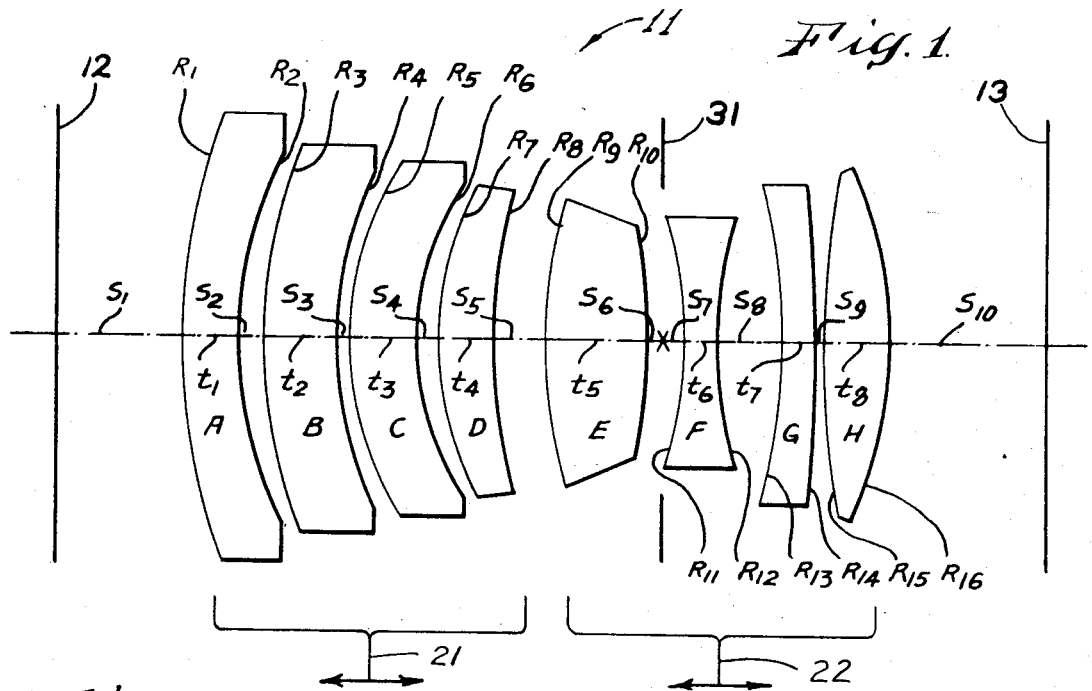

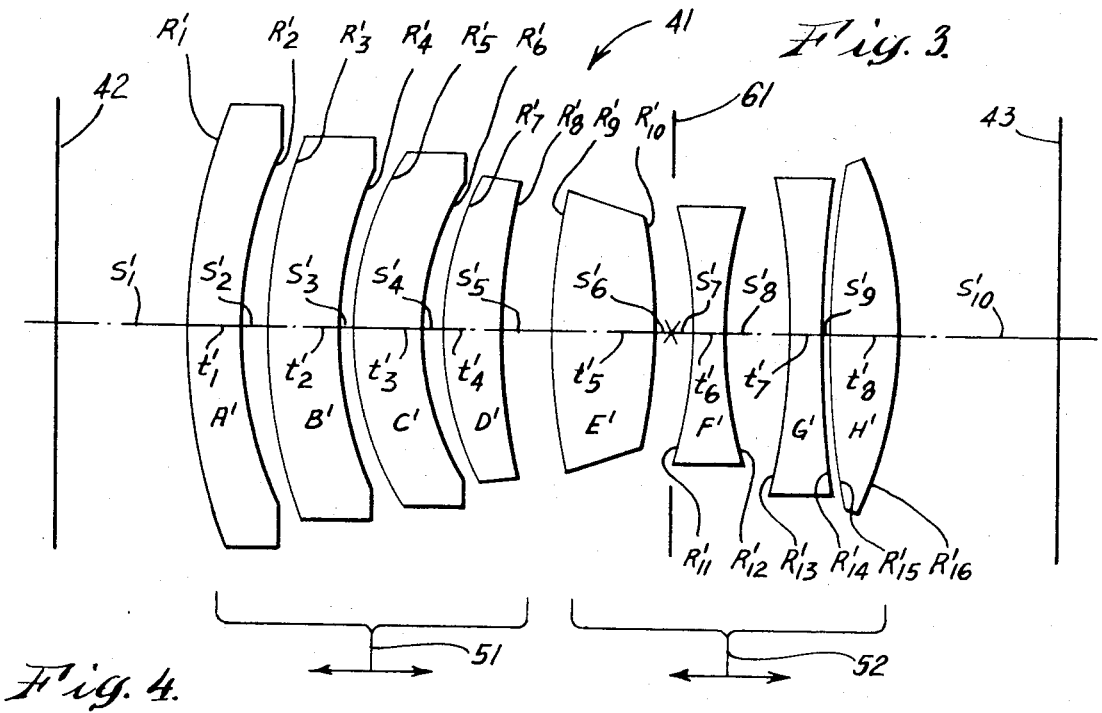

MECHANICALLY COMPENSATED ZOOM LENS SYSTEM

This invention relates to zoom lens systems. More particularly, this invention relates to a mechanically compensated zoom lens system suitable for use as a copying lens.

An example of a mechanically compensated zoom lens system is disclosed in U.S. Pat. No. 3,030,863 and an example of a copying lens is disclosed in U.S. Pat. No. 3,439,976.

It is an object of this invention to provide a new and improved zoom lens system.

It is another object of this invention to provide a new and improved mechanically compensated zoom lens system.

It is still another object of this invention to provide a zoom lens system that can be used as a copying lens.

It is yet still another object of this invention to provide a zoom lens system that has low distortion, a flat field, no vignetting, high resolution and nearly equal finite conjugates.

It is another object of this invention to provide a mechanically compensated zoom lens system that is achromatic over the spectrum of 4,000 A to 5,000 A, has a magnification range of 1.000 to 0.6500, has a relative aperture of f/11.8 over a field of view of about 44°, is compact, has high resolution and low distortion and is suitable for use in a copying machine having fixed rigid object and image separation.

The above and other objects are achieved by constructing a zoom lens system according to this invention. Briefly, the zoom lens system is made up of two movable lens groups, with each lens group consisting of four air-spaced lens elements.

A clearer concept of the scope and purpose of the invention along with various advantages and features thereof will be obtained from the following detailed description taken in conjunction with the drawings in which:

FIG. 1 is an optical diagram of one embodiment of the invention;

FIG. 2 is a chart of constructional data for the embodiment shown in FIG. 1;

FIG. 3 is an optical diagram of another embodiment of the invention; and

FIG. 4 is a chart of constructional data for the embodiment shown in FIG. 3.

Referring now to FIG. 1, the lens system as a whole is designated by reference numeral 11, the object plane of the lens system is designated by reference numeral 12 and the image plane of the system is designated by reference numeral 13. As can be seen, the lens system 11 is made up of two movable lens groups, the front lens group being identified by reference numeral 21 and the rear lens group being identified by reference numeral 22. Each lens group is made up of four air-spaced lens elements. Lens group 21 is made up of a negative meniscus shaped element A convex to the front, a negative meniscus shaped element B convex to the front, a negative meniscus shaped element C convex to the front and a positive meniscus-shaped element D convex to the front. Lens group 22 is made up of a first double convex element E, a double concave element F, a negative meniscus shaped element G concave to the front and a second double convex element H. A diaphragm 31 is positioned between element E and element F.

In FIG. 2 and repeated below for convenience is a chart of constructional data for the lens system shown in FIG. 1.

Referring now to FIG. 3, the lens system as a whole is designated by reference numeral 41, the object plane of the lens system is designated by reference numeral 42 and the image plane of the system is designated by reference numeral 43. As can be seen, the lens system 41 is made up of two movable lens groups, the front lens group being identified by reference numeral 51 and the rear lens group being identified by reference numeral 52. Each lens group is made up of four air-spaced lens elements. Lens group 51 is made up of a negative meniscus shaped element A' convex to the front, a negative meniscus shaped element B' convex to the front, a negative meniscus shaped element C' convex to the front and a positive meniscus shaped element D' convex to the front. Lens group 52 is made up of a first double convex element E', a first double concave element F', a second double concave element G' and a second double convex element H'. A diaphragm 61 is positioned between element E and element F.

In FIG. 4 and repeated below for convenience is a chart of constructional data for the lens system shown in FIG. 3.

CHART I

| Group | Lens | Radius | Thickness | Spacing | Nd at 4,500 A. | V at 4,500 A. |
|---|---|---|---|---|---|---|
| | | | | $S_1 = \begin{cases} 22.5474 \text{ at } 1.0000 \\ 25.0864 \text{ at } 0.8062 \\ 26.8680 \text{ at } 0.6500 \end{cases}$ | | |
| 21 | A | $R_1 = 6.3587$ | $t_1 = 0.4416$ | | 1.6027 | 49.55 |
| | | $R_2 = 3.3091$ | | $S_2 = 0.2128$ | | |
| | B | $R_3 = 4.3689$ | $t_2 = 0.6705$ | | 1.6562 | 27.82 |
| | | $R_4 = 3.1436$ | | $S_3 = 0.0872$ | | |
| | C | $R_5 = 2.4209$ | $t_3 = 0.5781$ | | 1.5994 | 52.67 |
| | | $R_6 = 2.2243$ | | $S_4 = 0.2112$ | | |
| | D | $R_7 = 2.7416$ | $t_4 = 0.4485$ | | 1.6850 | 33.63 |
| | | $R_8 = 4.9682$ | | $S_5 = \begin{cases} 0.2096 \text{ at } 1.0000 \\ 0.4556 \text{ at } 0.8062 \\ 1.1885 \text{ at } 0.6500 \end{cases}$ | | |
| 22 | E | $R_9 = 4.9243$ | $t_5 = 0.8397$ | | 1.6344 | 49.37 |
| | | $R_{10} = -8.1247$ | | $S_6 = 0.1941$ | | |
| | | | | $S_7 = 0.1731$ | | |
| | F | $R_{11} = -3.7706$ | $t_6 = 0.3219$ | | 1.6437 | 30.96 |
| | | $R_{12} = 5.4137$ | | $S_8 = 0.5024$ | | |
| | G | $R_{13} = -10.5610$ | $t_7 = 0.2556$ | | 1.6278 | 42.46 |
| | | $R_{14} = -55.8504$ | | $S_9 = 0.0214$ | | |
| | H | $R_{15} = 21.9775$ | $t_8 = 0.6498$ | | 1.6636 | 47.23 |
| | | $R_{16} = -3.5922$ | | $S_{10} = \begin{cases} 26.0552 \text{ at } 1.0000 \\ 23.2950 \text{ at } 0.8062 \\ 20.7559 \text{ at } 0.6500 \end{cases}$ | | |

NOTES.—F.O.V.=44°; F/#=F/11.8; Zoom mangification range=1.000x to 0.6500x; E.F.L.=From 13.3585 to 12.7476. All dimensions are in inches.

CHART II

| Group | Lens | Radius | Thickness | Spacing | Nd at 4,500 A. | V at 4,500 A. |
|---|---|---|---|---|---|---|
| | | | | $S'_1 = \begin{cases} 22.3261 \text{ at } 1.0000 \\ 24.2461 \text{ at } 0.8500 \\ 26.1964 \text{ at } 0.6500 \end{cases}$ | | |
| 51 | A' | $R'_1 = 6.2336$ | $t'_1 = 0.4572$ | | 1.6027 | 49.55 |
| | | $R'_2 = 3.6346$ | | $S'_2 = 0.2869$ | | |
| | B' | $R'_3 = 4.1518$ | $t'_2 = 0.3772$ | | 1.6562 | 27.82 |
| | | $R'_4 = 3.4555$ | | $S'_3 = 0.1898$ | | |
| | C' | $R'_5 = 2.6670$ | $t'_3 = 0.5194$ | | 1.5994 | 52.67 |
| | | $R'_6 = 2.5111$ | | $S'_4 = 0.3689$ | | |
| | D' | $R'_7 = 3.2701$ | $t'_4 = 0.3992$ | | 1.6850 | 33.63 |
| | | $R'_8 = 4.8112$ | | $S'_5 = \begin{cases} 0.5058 \text{ at } 1.0000 \\ 0.6979 \text{ at } 0.8500 \\ 1.9057 \text{ at } 0.6500 \end{cases}$ | | |
| | E' | $R'_9 = 4.2944$ | $t'_5 = 0.7614$ | | 1.6344 | 49.37 |
| | | $R'_{10} = -11.7065$ | | $S'_6 = 0.2734$ $S'_7 = 0.1489$ | | |
| 52 | F' | $R'_{11} = -4.5438$ | $t'_6 = 0.2102$ | | 1.6437 | 30.96 |
| | | $R'_{12} = 4.6056$ | | $S'_8 = 0.5179$ | | |
| | G' | $R'_{13} = 13.8566$ | $t'_7 = 0.2772$ | | 1.6278 | 42.46 |
| | | $R'_{14} = 40.5186$ | | $S'_9 = 0.0202$ | | |
| | H' | $R'_{15} = 13.9845$ | $t'_8 = 0.8576$ | | 1.6636 | 47.23 |
| | | $R'_{16} = -3.9890$ | | $S'_{10} = \begin{cases} 25.9794 \text{ at } 1.0000 \\ 23.8673 \text{ at } 0.8500 \\ 20.7093 \text{ at } 0.6500 \end{cases}$ | | |

NOTES.—F.O.V.=44°; F/#=F/11.8; Zoom magnification range=$1.000x$ to $0.6500x$; E.F.L.=From 13.4105 to 12.7803. All dimensions are in inches.

CHART III

| Group | Lens | Radius | Thickness | Spacing | Nd at 4,500 A. | V at 4,500 A. |
|---|---|---|---|---|---|---|
| | | | | $S'_1 = \begin{cases} 22.2626 \text{ at } 1.0000 \\ 25.1462 \text{ at } 0.7700 \\ 26.3023 \text{ at } 0.6500 \end{cases}$ | | |
| 51 | A' | $R'_1 = 6.2929$ | $t'_1 = 0.4574$ | | 1.6027 | 49.55 |
| | | $R'_2 = 3.5374$ | | $S'_2 = 0.2645$ | | |
| | B' | $R'_3 = 3.7687$ | $t'_2 = 0.5992$ | | 1.6562 | 27.82 |
| | | $R'_4 = 3.1209$ | | $S'_3 = 0.1933$ | | |
| | C' | $R'_5 = 2.4784$ | $t'_3 = 0.4481$ | | 1.5994 | 52.67 |
| | | $R'_6 = 2.3720$ | | $S'_4 = 0.3651$ | | |
| | D' | $R'_7 = 3.1881$ | $t'_4 = 0.3244$ | | 1.6850 | 33.63 |
| | | $R'_8 = 4.6897$ | | $S'_5 = \begin{cases} 0.4094 \text{ at } 1.0000 \\ 0.8540 \text{ at } 0.7700 \\ 1.6478 \text{ at } 0.6500 \end{cases}$ | | |
| | E' | $R'_9 = 4.4909$ | $t'_5 = 0.8353$ | | 1.6344 | 49.37 |
| | | $R'_{10} = -9.1848$ | | $S'_6 = 0.1722$ $S'_7 = 0.1839$ | | |
| 52 | F' | $R'_{11} = -4.2271$ | $t'_6 = 0.2774$ | | 1.6437 | 30.96 |
| | | $R'_{12} = 4.8518$ | | $S'_8 = 0.5857$ | | |
| | G' | $R'_{13} = -11.4474$ | $t'_7 = 0.2810$ | | 1.6278 | 42.46 |
| | | $R'_{14} = 817.5278$ | | $S'_9 = 0.0206$ | | |
| | H' | $R'_{15} = 18.6167$ | $t'_8 = 0.7365$ | | 1.6636 | 47.23 |
| | | $R'_{16} = -3.8587$ | | $S'_{10} = \begin{cases} 26.0475 \text{ at } 1.0000 \\ 22.7192 \text{ at } 0.7700 \\ 20.7692 \text{ at } 0.6500 \end{cases}$ | | |

NOTE.—F.O.V.=38°; F/#=F/11.8; Zoom magnification range=$1.000x$ to $0.6500x$; E.F.L.=From 13.4105 to 12.7807. All dimensions are in inches.

In all of the charts, the radii of curvature R of the lens elements, the thicknesses $t$ of the lens elements, the spacings $s$ between the lens elements, the index of refraction Nd of the lens elements and the Abbe numbers $v$ of the lens elements are all expressed in the customary manner.

What is claimed is:

1. A mechanically compensated zoom lens system consisting essentially of an axially movable front lens group and an axially movable rear lens group, each lens group consisting essentially of four air-spaced elements, the front lens group consisting essentially of, from the front to the rear, a first negative meniscus convex to the front, a second negative meniscus convex to the front, a third negative meniscus convex to the front and a positive meniscus convex to the front and the rear lens group consisting essentially of, from the front to the rear a first double convex element, a double concave element, a negative meniscus element concave to the front and a second double convex element.

2. A mechanically compensated zoom lens system made substantially according to the following specifications:

| Group | Lens | Radius | Thickness | Spacing | Nd at 4,500 A. | V at 4,500 A. |
|---|---|---|---|---|---|---|
| | | | | $S_1 = \begin{cases} 22.5474 \text{ at } 1.0000 \\ 25.0864 \text{ at } 0.8062 \\ 26.8680 \text{ at } 0.6500 \end{cases}$ | | |
| | A | $R_1 = 6.3587$ | $t_1 = 0.4416$ | | 1.6027 | 49.55 |
| | | $R_2 = 3.3091$ | | $S_2 = 0.2128$ | | |
| | B | $R_3 = 4.3689$ | $t_2 = 0.6705$ | | 1.6562 | 27.82 |
| 21 | | $R_4 = 3.1436$ | | $S_3 = 0.0872$ | | |
| | C | $R_5 = 2.4209$ | $t_3 = 0.5781$ | | 1.5994 | 52.67 |
| | | $R_6 = 2.2243$ | | $S_4 = 0.2112$ | | |
| | D | $R_7 = 2.7416$ | $t_4 = 0.4485$ | | 1.6850 | 33.36 |
| | | $R_8 = 4.9682$ | | $S_5 = \begin{cases} 0.2096 \text{ at } 1.0000 \\ 0.4556 \text{ at } 0.8062 \\ 1.1885 \text{ at } 0.6500 \end{cases}$ | | |
| | E | $R_9 = 4.9243$ | $t_5 = 0.8397$ | | 1.6344 | 49.37 |
| | | $R_{10} = -8.1247$ | | $S_6 = 0.1941$ $S_7 = 0.1731$ | | |
| 22 | F | $R_{11} = -3.7706$ | $t_6 = 0.3219$ | | 1.6437 | 30.96 |
| | | $R_{12} = 5.4137$ | | $S_8 = 0.5024$ | | |
| | G | $R_{13} = -10.5610$ | $t_7 = 0.2556$ | | 1.6278 | 42.46 |
| | | $R_{14} = -55.8504$ | | $S_9 = 0.0214$ | | |
| | H | $R_{15} = 21.9775$ | $t_8 = 0.6498$ | | 1.6636 | 47.23 |
| | | $R_{16} = -3.5922$ | | $S_{10} = \begin{cases} 26.0552 \text{ at } 1.0000 \\ 23.2950 \text{ at } 0.8062 \\ 20.7559 \text{ at } 0.6500 \end{cases}$ | | |

NOTES.—F.O.V.=44°; F/#=F/11.8; Zoom Magnification range=1.000x to 0.6500x; E.F.L.=From 13.3585 to 12.7476. All dimensions are in inches.

3. A mechanically compensated zoom lens system consisting essentially of an axially movable front lens group and an axially movable rear lens group, each lens group consisting essentially of four air-spaced elements, the front lens group consisting essentially of, from the front to the rear, a first negative meniscus convex to the front, a second negative meniscus convex to the front, a third negative meniscus convex to the front and a positive meniscus convex to the front and the rear lens group consisting essentially of, from the front to the rear a first double convex element, a first double concave element, a second double concave element and a second double convex element.

4. A mechanically compensated zoom lens system made substantially according to the following specifications:

| Group | Lens | Radius | Thickness | Spacing | Nd at 4,500 A. | V at 4,500 A. |
|---|---|---|---|---|---|---|
| | | | | $S'_1 = \begin{cases} 22.3261 \text{ at } 1.0000 \\ 24.2461 \text{ at } 0.8500 \\ 26.1964 \text{ at } 0.6500 \end{cases}$ | | |
| | A' | $R'_1 = 6.2336$ | $t'_1 = 0.4572$ | | 1.6027 | 49.55 |
| | | $R'_2 = 3.6346$ | | $S'_2 = 0.2869$ | | |
| | B' | $R'_3 = 4.1518$ | $t'_2 = 0.3772$ | | 1.6562 | 27.82 |
| 51 | | $R'_4 = 3.4555$ | | $S'_3 = 0.1898$ | | |
| | C' | $R'_5 = 2.6670$ | $t'_3 = 0.5194$ | | 1.5994 | 52.67 |
| | | $R'_6 = 2.5111$ | | $S'_4 = 0.3689$ | | |
| | D' | $R'_7 = 3.2701$ | $t'_4 = 0.3992$ | | 1.6850 | 33.63 |
| | | $R'_8 = 4.8112$ | | $S'_5 = \begin{cases} 0.5058 \text{ at } 1.0000 \\ 0.6979 \text{ at } 0.8500 \\ 1.9057 \text{ at } 0.6500 \end{cases}$ | | |
| | E' | $R'_9 = 4.2944$ | $t'_5 = 0.7614$ | | 1.6344 | 49.37 |
| | | $R'_{10} = 11.7065$ | | $S'_6 = 0.2734$ $S'_7 = 0.1489$ | | |
| 52 | F' | $R'_{11} = 4.5438$ | $t'_6 = 0.2102$ | | 1.6437 | 30.96 |
| | | $R'_{12} = 4.6056$ | | $S'_8 = 0.5179$ | | |
| | G' | $R'_{13} = -13.8566$ | $t'_7 = 0.2772$ | | 1.6278 | 42.46 |
| | | $R'_{14} = 40.5186$ | | $S'_9 = 0.0202$ | | |
| | H' | $R'_{15} = 13.9845$ | $t'_8 = 0.8576$ | | 1.6636 | 47.23 |
| | | $R'_{16} = -3.9890$ | | $S'_{10} = \begin{cases} 25.9794 \text{ at } 1.0000 \\ 23.8673 \text{ at } 0.8500 \\ 20.7093 \text{ at } 0.6500 \end{cases}$ | | |

NOTES.—F.O.V.=44°; F/#=F/11.8; Zoom magnification range=1.000x to 0.6500x; E.F.L.=From 13.4105 to 12.7803. All dimensions are in inches.

5. A mechanically compensated zoom lens system made substantially according to the following specifications:

| Group | Lens | Radius | Thickness | Spacing | Nd at 4,500 A. | V at 4,500 A. |
|---|---|---|---|---|---|---|
| 51 | A' | $R'_1 = 6.2929$ | $t'_1 = 0.4574$ | $S'_1 = \begin{cases} 22.2626 \text{ at } 1.0000 \\ 25.1463 \text{ at } 0.7700 \\ 26.3023 \text{ at } 0.6500 \end{cases}$ | 1.6027 | 49.55 |
| | | $R'_2 = 3.5374$ | | $S'_2 = 0.2645$ | | |
| | B' | $R'_3 = 3.7687$ | $t'_2 = 0.5992$ | | 1.6562 | 27.82 |
| | | $R'_4 = 3.1209$ | | $S'_3 = 0.1933$ | | |
| | C' | $R'_5 = 2.4784$ | $t'_3 = 0.4481$ | | 1.5994 | 52.67 |
| | | $R'_6 = 2.3720$ | | $S'_4 = 0.3651$ | | |
| | D' | $R'_7 = 3.1881$ | $t'_4 = 0.3244$ | | 1.6850 | 33.63 |
| | | $R'_8 = 4.6897$ | | $S'_5 = \begin{cases} 0.4094 \text{ at } 1.0000 \\ 0.8540 \text{ at } 0.7700 \\ 1.6478 \text{ at } 0.6500 \end{cases}$ | | |
| 52 | E' | $R'_9 = 4.4909$ | $t'_5 = 0.8353$ | | 1.6344 | 49.37 |
| | | $R'_{10} = -9.1848$ | | $S'_6 = 0.1722$ | | |
| | F' | $R'_{11} = -4.2271$ | $t'_6 = 0.2774$ | $S'_7 = 0.1839$ | 1.6437 | 30.96 |
| | | $R'_{12} = 4.8518$ | | $S'_8 = 0.5857$ | | |
| | G' | $R'_{13} = -11.4474$ | $t'_7 = 0.2810$ | | 1.6278 | 42.46 |
| | | $R'_{14} = 817.5278$ | | $S'_9 = 0.0206$ | | |
| | H' | $R'_{15} = 18.6167$ | $t'_8 = 0.7365$ | | 1.6636 | 47.23 |
| | | $R'_{16} = -3.8587$ | | $S'_{10} = \begin{cases} 26.0475 \text{ at } 1.0000 \\ 22.7192 \text{ at } 0.7700 \\ 20.7692 \text{ at } 0.6500 \end{cases}$ | | |

NOTES.—F.O.V.=38°; F/#=F/11.8; Zoom magnification range=1.000x to 0.6500x; E.F.L.=From 13.4105 to 12.7807. All dimensions are in inches.

* * * * *